US008729478B2

(12) United States Patent
Tredwell et al.

(10) Patent No.: US 8,729,478 B2
(45) Date of Patent: May 20, 2014

(54) DUAL SCREEN RADIOGRAPHIC DETECTOR WITH IMPROVED SPATIAL SAMPLING

(75) Inventors: Timothy J. Tredwell, Fairport, NY (US); Mark E. Shafer, Fairport, NY (US); Robert W. Kulpinski, Penfield, NY (US); Timothy J. Wojcik, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 591 days.

(21) Appl. No.: 12/797,114

(22) Filed: Jun. 9, 2010

(65) Prior Publication Data

US 2011/0303849 A1 Dec. 15, 2011

(51) Int. Cl.
*G01T 1/10* (2006.01)
*G01T 1/20* (2006.01)

(52) U.S. Cl.
USPC ........ 250/362; 250/366; 250/367; 250/370.11

(58) Field of Classification Search
USPC ............................. 250/362, 366, 367, 370.11
See application file for complete search history.

(56) References Cited

U.S. PATENT DOCUMENTS

| | | | | |
|---|---|---|---|---|
| 5,138,167 A | * | 8/1992 | Barnes | 250/370.01 |
| 7,868,925 B2 | * | 1/2011 | Motomura et al. | 348/222.1 |
| 2006/0054782 A1 | * | 3/2006 | Olsen et al. | 250/208.1 |
| 2006/0067472 A1 | * | 3/2006 | Possin et al. | 378/98.9 |
| 2006/0151708 A1 | * | 7/2006 | Bani-Hashemi et al. | 250/370.11 |
| 2008/0011960 A1 | * | 1/2008 | Yorkston et al. | 250/370.09 |
| 2008/0245968 A1 | | 10/2008 | Tredwell et al. | |
| 2010/0054418 A1 | | 3/2010 | Okada et al. | |
| 2010/0072383 A1 | | 3/2010 | Okada | |
| 2011/0096892 A1 | * | 4/2011 | Forthmann et al. | 378/5 |

FOREIGN PATENT DOCUMENTS

DE 10 2008 006 514 8/2009

OTHER PUBLICATIONS

European Search Report completed Sep. 9, 2013 for European Application No. 11004675.2, 2 pages.

* cited by examiner

*Primary Examiner* — Michael G Lee
*Assistant Examiner* — Laura Gudorf

(57) ABSTRACT

Embodiments of radiographic imaging apparatus and methods for operating the same can include a first scintillator, a second scintillator, a plurality of first photosensitive elements, and a plurality of second photosensitive elements. The plurality of first photosensitive elements receives light from the first scintillator and has first photosensitive element characteristics chosen to cooperate with the first scintillator properties. The plurality of second photosensitive elements are arranged to receive light from the second scintillator and has second photosensitive element characteristics different from the first photosensitive element characteristics and chosen to cooperate with the second scintillator properties. Further, the first scintillator can have first scintillator properties and the second scintillator can have second scintillator properties different from the first scintillator properties.

22 Claims, 12 Drawing Sheets

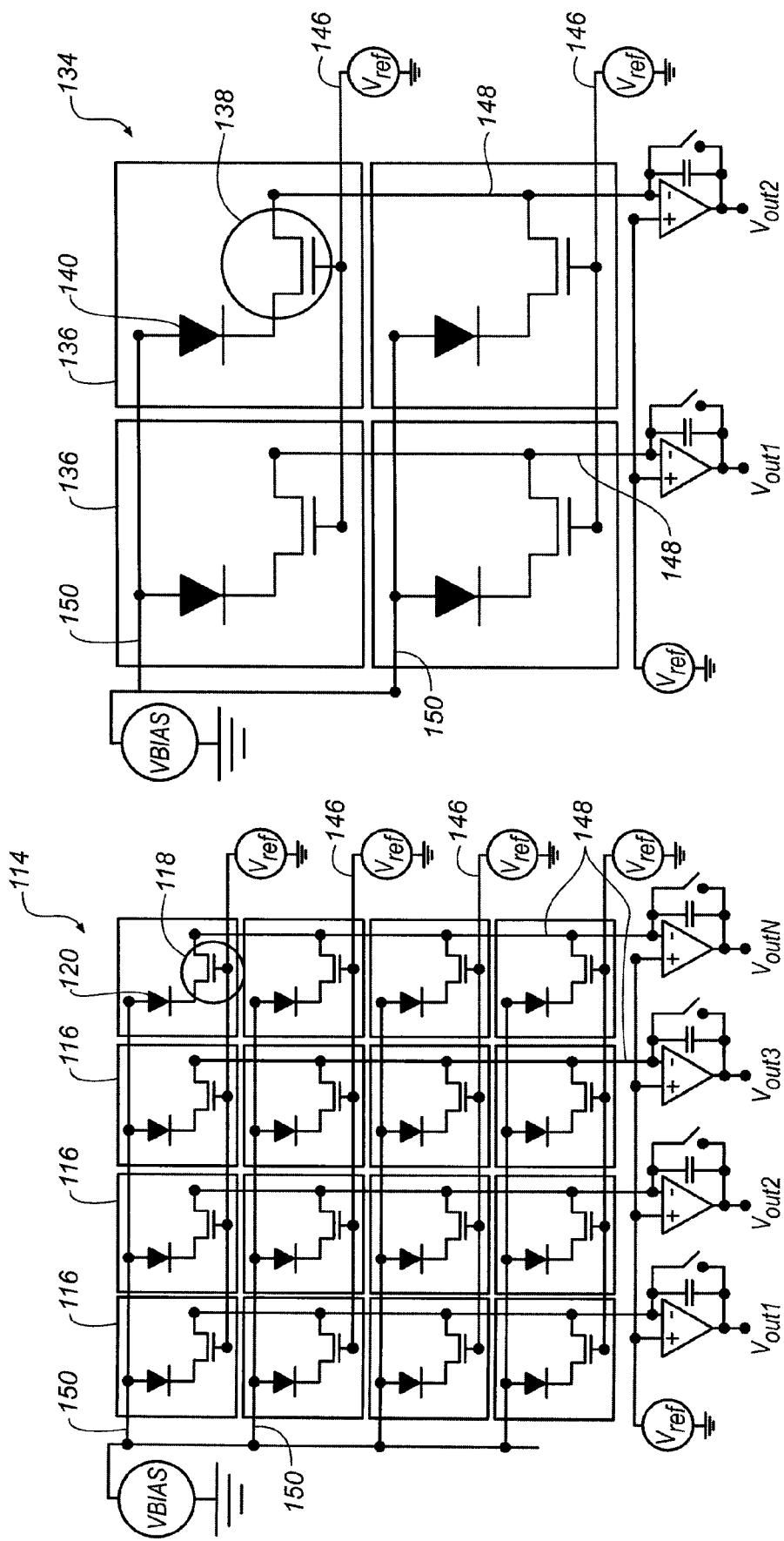

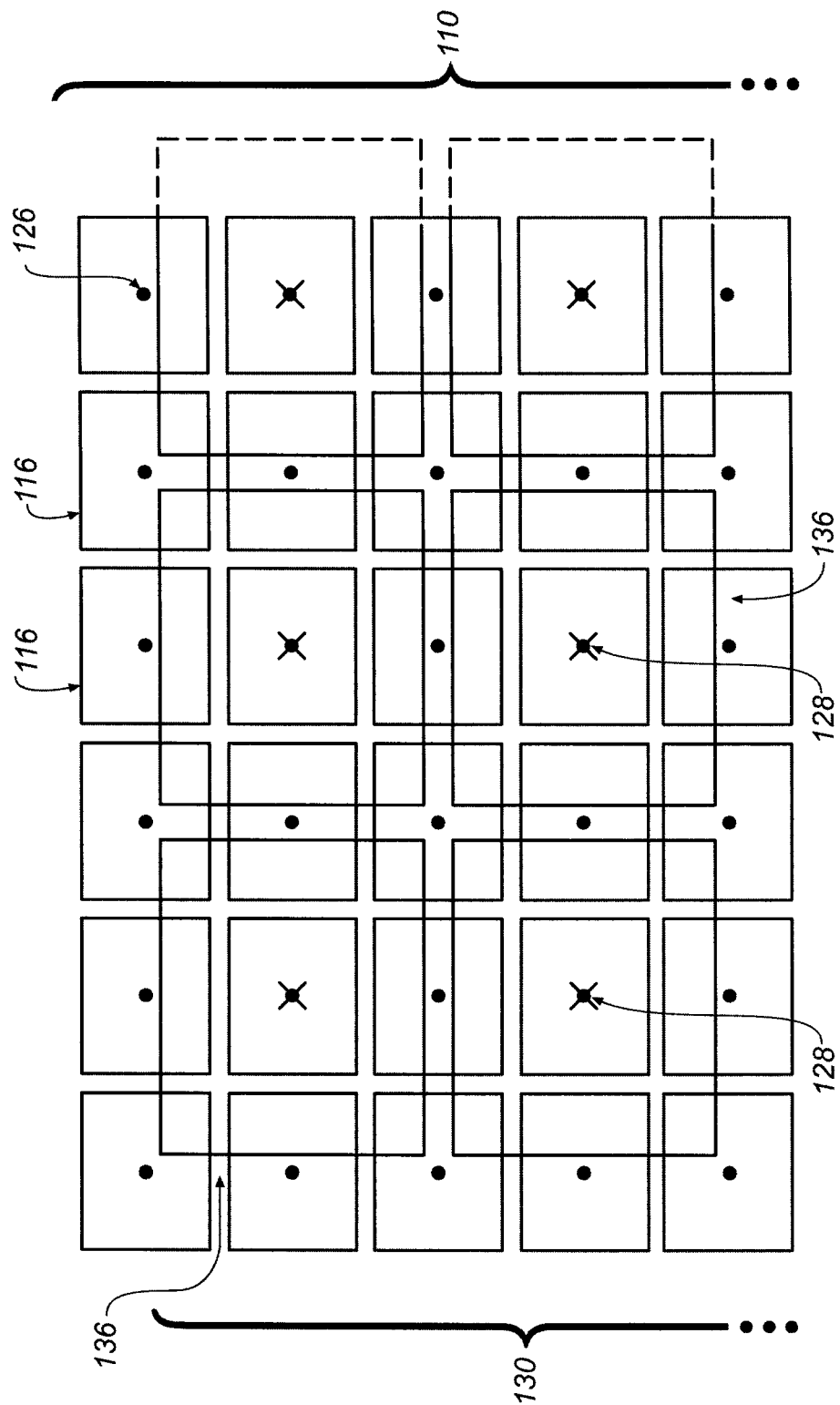

DUAL SCREEN RADIOGRAPHIC DETECTOR WITH IMPROVED SPATIAL SAMPLING

BACKGROUND OF THE INVENTION

1. Technical Field

The present invention relates to digital radiographic detectors. More particularly, the present invention relates to a digital radiographic detector with two scintillating screens and improved spatial sampling.

2. Description of Related Art

Digital radiographic imaging devices are becoming increasingly used in both medicinal and industrial applications. Conventional radiographic imaging devices generally include an array of pixels formed on a substrate. Each pixel includes a photosensitive element and a readout element. Conventionally known photosensitive elements include p-n junction photodiodes, metal-insulator-semiconductor (MIS) photo-capacitors, and pinned photodiodes, among others. The presently most commonly used readout element is a thin-film transistor (TFT), although other readout elements also may be used. In use, the photosensitive element converts an incident light into an electrical signal, and the electrical signal is read out by the readout element. An electrical signal for each of the pixels is read out, and these signals are used to recreate the image, across the array. For example, using appropriate processing, the electrical signals can be displayed on a display or video monitor, to show the exposed image.

Digital radiation detectors are conventionally used with an X-ray image source. Specifically, an article to be imaged, such as a person or inanimate object, is placed between the X-ray image source and the radiographic imaging device and the article to be imaged is exposed with X-rays. The X-rays pass through the article and are detected upon their emergence from the article by the radiographic imaging device. The X-rays may be detected or may first be converted to visible light by a scintillator. When a scintillating screen is provided, it is usually placed between the article and the photosensitive element, to convert the X-rays to light in the visible spectrum, for conversion to an electrical signal by the photosensitive element.

Generally, medical X-ray detectors employing a scintillating phosphor screen to absorb X-rays and produce light suffer the loss of spatial resolution due to lateral light diffusion in the phosphor screen. To reduce lateral light diffusion and maintain acceptable spatial resolution, the phosphor screens must be made sufficiently thin.

The spatial resolution and X-ray detection ability of an imaging apparatus are often characterized by the modulation transfer function (MTF) and X-ray absorption efficiency, respectively. Thin phosphor screens produce better MTF at the expense of reduced X-ray absorption. Usually, the coating density and the thickness of the phosphor screen are used in the design tradeoff between spatial resolution and X-ray absorption efficiency.

For example, the Lanex Fine and the Lanex Fast Back screens are two typical commercial screens manufactured by Eastman Kodak Company, both made of $Gd_2O_2S(Tb)$ phosphor. The Lanex Fast Back screen is thicker and absorbs X-rays more efficiently, but has lower resolution than the Lanex Fine screen. On the other hand, the Lanex Fine screen is thinner than the Lanex Fast Back screen, absorbs X-rays less efficiently, but has higher resolution. The coating densities of the Lanex Fine and the Lanex Fast Back screens are 34 mg/cm$^2$ and 133 mg/cm$^2$, respectively. The Lanex Fine and the Lanex Fast Back screens have X-ray absorption efficiencies of 24% and 63% (for 80 kVp, with tungsten target, 2.5-mm Al inherent filtration, and filtered by 0.5-mm Cu) and an MTF values of 0.26 and 0.04 at 5 c/mm, respectively. In general, the signal-to-noise ratio (SNR) of an X-ray scintillator increases as the X-ray absorption efficiency of the scintillator increases. The MTF of an X-ray scintillator can also be evaluated by the spatial frequency at which the MTF equals 50% ($f_{1/2}$). As this spatial frequency ($f_{1/2}$) value increases, the MTF of the scintillator also increases. For the aforementioned example, the value of $f_{1/2}$ is 2.6 c/mm for the Lanex Fine screen and 1.0 c/mm for the Lanex Fast Back screen.

In order to improve X-ray absorption and maintain spatial resolution, the use of double screens in conjunction with a double-emulsion film has been incorporated in conventional screen-film (SF) radiographic apparatuses. Similarly, the dual-screen technique has also been used in computed radiography (CR) to improve the X-ray absorption efficiency. In a digital CR apparatus, a storage phosphor screen is used in place of the prompt emitting phosphor screen employed in the SF apparatus. No film is needed. Upon X-ray exposure, the storage phosphor screen stores a latent image in the form of trapped charge that is subsequently read out, typically by a scanning laser beam, to produce a digital radiographic image.

Another imaging technique, known as dual energy subtraction imaging, has been used to reduce the impact of anatomic background on disease detection in chest radiography and angiography. This method is based on the different energy-dependent absorption characteristics of bone and soft tissue. In general, two raw images are produced. One is a low-energy and high-contrast image, and the other is a high-energy and low-contrast image. By taking nonlinear combinations of these two images, pure bone and soft-tissue images can be obtained. This imaging technique would improve diagnosis of pathology and delineation of anatomy using images.

The dual energy subtraction imaging method has two general approaches: dual-exposure technique and single-exposure technique. In the dual-exposure technique, two different images are obtained from a detector by making two exposures at two different X-ray tube voltage settings. Since a double exposure of the patient must be performed, and the switching of the X-ray tube voltage must take a finite time, the double exposure technique would be sensitive to patient motion artifacts and to misregistration between the two images. In the single-exposure technique, in which an energy filter is sandwiched between two detectors to attenuate the low-energy component, two different images are simultaneously obtained by making only one exposure of the patient. The single-exposure technique has the advantages of reducing patient motion misregistration artifacts and reducing X-ray dosage. The dual energy subtraction imaging has been implemented in both the screen-film and computed radiography apparatus with either the single-exposure or the dual-exposure technique.

While digital radiography has brought X-ray imaging into the digital age, and several improvements have already been made in this field, the technology has not yet been optimized. For example, by increasing the signal-to-noise ratio of output of each pixel, a better representation of the imaged article can be obtained. Better images also can be obtained by increasing the spatial frequency and the modulation transfer function. However, and as will be appreciated by imaging designers and manufacturers, these factors that increase the efficacy of imaging detectors are often at odds with each other, that is, taking steps to improve the signal-to-noise ratio often leads to worse spatial frequency or modulation transfer function.

Thus, there is a need in the art for an improved imaging apparatus. Specifically, there is a need in the art for a radiographic imaging apparatus with improved signal-to-noise, spatial frequency, and/or modulation transfer function characteristics.

SUMMARY OF THE INVENTION

Embodiments according to the present invention address the foregoing needs in the art by providing an improved radiographic imaging apparatus having a first scintillator, a second scintillator, a plurality of first photosensitive elements, and a plurality of second photosensitive elements. The first scintillator has first scintillator properties and the second scintillator has second scintillator properties different from the first scintillator properties. The plurality of first photosensitive elements receives light from the first scintillator and have first photosensitive element characteristics chosen to cooperate with the first scintillator properties. The plurality of second photosensitive elements are arranged to receive light from the second scintillator and have second photosensitive element characteristics different from the first photosensitive element characteristics and chosen to cooperate with the second scintillator properties.

In another aspect, the present invention provides a radiographic imaging device having a plurality of first pixels, a first scintillator, a plurality of second pixels, and a second scintillator. Each of the first pixels includes a first photosensitive element having a first photosensitive element characteristic and a first readout element. The first scintillator is arranged proximate the plurality of first photosensitive elements, and the first photosensitive elements of the first pixels are primarily sensitive to the first scintillator. Each of the plurality of second pixels includes a second photosensitive element having a second photosensitive element characteristic different from the first photosensitive element characteristic and a second readout element. The second scintillator is arranged proximate the plurality of second pixels, and the second photosensitive elements of the second pixels are primarily sensitive to the second scintillator. The first and second photosensitive element characteristics include at least one of photosensitive element area, photosensitive element pitch, photosensitive element sensitivity, and/or total number of photosensitive elements.

These and other aspects, objects, and features of the invention may be appreciated with reference to the accompanied detailed description of the invention and Figures, which describe and illustrate exemplary embodiments of the present invention.

BRIEF DESCRIPTION OF THE DRAWING FIGURES

FIGS. 2A and 2B are circuit diagrams of, respectively, the top and bottom portions of the radiographic imaging detector of FIG. 1.

FIG. 2C is a diagram illustrating exemplary alignments of pixels and/or sampling grids corresponding to first detectors and second detectors of a dual screen radiographic imaging apparatus according to exemplary embodiments of the invention.

DETAILED DESCRIPTION OF EXEMPLARY EMBODIMENTS

Embodiments according to the application will be described with reference to the accompanying figures.

Figure 1:
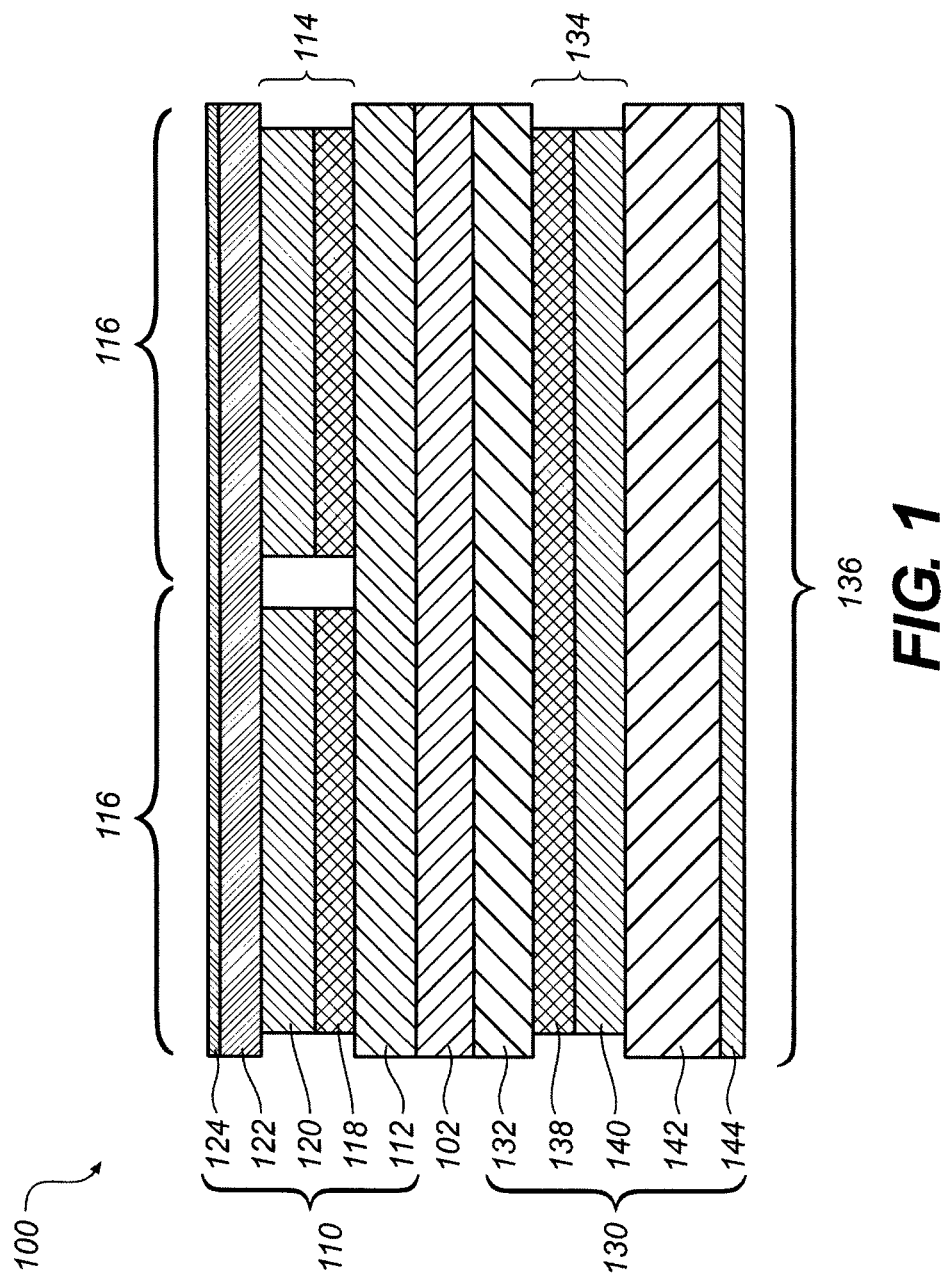
FIG. 1 is a schematic elevation view of a portion of a radiographic imaging detector according to a first embodiment of the invention.

FIG. 1 illustrates a first embodiment of a dual screen radiographic imaging apparatus 100. Generally speaking, the dual screen radiographic imaging apparatus 100 includes a first detector 110 and a second detector 130. In the example of FIG. 1, the first detector 110 and the second detector 130 are separated by and disposed on the opposite sides of a filter 102. According to its use thereof, the filter 102 can be an x-ray filter and/or an optical filter.

The first detector 110 includes a first substrate 112 upon which a first detector array 114 is disposed. The first detector array 114 preferably includes a number of first pixels 116, and each first pixel 116 includes a first readout element 118 and a first photosensitive element 120. A first scintillating phosphor screen 122 is disposed on the first detector array 114, on a side opposite the first substrate 112. A light management layer 124 also is provided on the first scintillating phosphor screen. For example, the light management layer 124 can be a reflecting layer, an absorbing layer or the like. As shown in FIG. 1, the light management layer 124 is a light absorbing layer.

The second detector 130 has features similar to those of the first detector 110. For example, the second detector generally includes a second substrate 132 upon which a second detector array 134 is formed. The second detector array 134 is similar to the first detector array 114 in that the second detector array 134 is made up of a number of second pixels 136. (Only one second pixel is illustrated in FIG. 1.) Each of the second pixels 136 includes a second readout element 138 and a second photosensitive element 140. A second scintillating phosphor screen 142 is disposed on the second detector array 134 on a side of the detector array opposite the second substrate 132. A second light management layer 144 also is formed on the second scintillating phosphor screen 142. For example, the light management layer 144 can be a reflecting layer, an absorbing layer or the like.

Although the first detector and the second detector are similar in their composition, the first pixels 116 making up the first detector array 114 have an area that is smaller than that of the second pixels 136 making up the second detector array 134. In the example of FIG. 1, two of the pixels 116 in the first detector array occupy the same linear distance as one pixel 136 in the second detector array 134. According to this construction, the first detector array 114 has twice has many pixels in each linear direction as the second detector array 134. The pixel pitch of the first detector array 114 is half that of the pixel pitch of the second detector array 134. Moreover, the first detector array 114 and the second detector array 134 can be arranged in a matrix fashion having a number of pixels along each of x and y coordinates. Accordingly, assuming the pixels are square, four first pixels 116 in the first detector array 114 occupy the same surface area as one second pixel 136 in the second detector array 134.

Also in this embodiment, the first scintillating phosphor screen 122 is thinner than the second scintillating phosphor screen 142. The first photosensitive elements are arranged to receive light primarily (e.g., only) from the first scintillating phosphor screen 122 and the second photosensitive elements are arranged to receive light primarily (e.g., only) from the second scintillating phosphor screen 142. Thus, the denser pixel arrangement of the first detector array 114 (having the relatively smaller pitch) is paired with the thinner screen, whereas the less dense pixel arrangement is paired with a relatively thicker screen. Accordingly, the higher resolution screen is paired with a higher spatial sampling frequency detector array and the higher sensitivity scintillating phosphor screen is paired with a lower spatial frequency but higher sensitivity detector array.

In use, X-rays impinge upon the radiographic imaging apparatus 100 on one side of the imaging apparatus 100. Of the impinging X-rays, some are converted to visible light by the first scintillator 122. The converted X-rays are detected by the first photosensitive elements 120, with each creating an electrical signal corresponding to the amount of incident light. The first readout elements 118 read out the electrical signal. Those X-rays that are not converted by the first scintillator travel to the second scintillator 142 where they are converted to visible light and detected by the second photosensitive elements 140. Some X-rays may reach the second scintillating screen 142 because they have different properties from those absorbed by the first scintillating screen 122, such as a different wavelength or intensity, or they may reach the second scintillating screen merely because the first scintillating screen 122 is not 100% efficient. The electrical signal created by each of the photosensitive elements 140 is read out by the readout elements 138. The readouts of the first and second detectors 110, 130 can be manipulated by appropriate signal processing to create a composite image, having characteristics of both the first and second detectors.

According to exemplary embodiments, the first photosensor array can be used to detect the high-frequency component of an x-ray image captured by the first scintillating phosphor screen, and the second photosensor array can be used to detect the low-frequency component of the same x-ray image captured by the second scintillating phosphor screen. The first scintillating phosphor screen has a higher resolution (and MTF) than the second scintillating phosphor screen (e.g., the two screens can be made of the same materials, but the first screen is thinner than the second screen). The high- and low-frequency components of the captured image can be combined as follows.

In one embodiment, the pixel size and pixel pitch of the first photosensor array are equal or smaller than that of the second photosensor array. To match or have the correct registration, the low-frequency component image is interpolated such that the missing pixels are calculated in accordance with the grid of the first photosensor array. Alternatively, sampling of the first photosensor can be used. In case of the second photosensor array having a pixel area four times the first photosensor array (such as the embodiment shown in FIG. 1), the low-frequency component image detected by the second photosensor array is interpolated. There are many methods of interpolation such as pixel replication (nearest neighbor), linear interpolation, cubic convolution, cubic B-splines, and Gaussian interpolation, among others. Among these methods, the linear interpolation and cubic convolution are preferably used because of their modest computation complexity and moderate reconstruction error. Additional image data processes can also be performed. After interpolation, the high- and low-frequency component images become $I_H(x,y)$ and $I_L(x,y)$, respectively, where x and y are the pixel coordinates.

There are many methods to combine the two interpolated component images into a single image, $I(x,y)$, including simple addition, $I(x, y)=I_H(x, y)+I_L(x, y)$; simple weighted addition, $I(x, y)=aI_H(x,y)+(1-a)I_L(x, y)$, where a is a weighting factor; multiple weighted addition, in which the weighting factor "a" in Eq. (2) is varied to increase or optimize the detective quantum efficiency of the imaging system at specific spatial frequencies; and frequency domain weighted addition, which resembles image filtering in the frequency domain. The interpolated high- and low-frequency component images are first Fourier transformed into the frequency domain, $\tilde{I}_H(u, v)$ and $\tilde{I}_L(u, v)$, and then superimposed using $\tilde{I}(u, v)=\alpha_{opt}(f) \tilde{I}_H(u, v)+[1-\alpha_{opt}(f)]\tilde{I}_L(u, v)$, where $f=\sqrt{u^2+v^2}$ and $\alpha_{opt}$ is the optimized weighting factor for frequency f. Following the superimposition, $\tilde{I}(u, v)$ is Fourier transformed back into the spatial domain to obtain the superimposed image, $I(x, y)$, where $I(x, y)=\iint du\,dv \cdot e^{2\pi i(ux+vy)}\tilde{I}(u, v)$.

When the imaging system is used to implement the single-exposure dual energy imaging application, the first scintillating phosphor screen (e.g., closer to the patient) and the first photosensor array capture the low-energy image, and the second scintillating phosphor screen and the second photosensor array capture the high-energy image. The new image can be obtained by subtracting the interpolated high-energy image, $I_1(x,y)$, from the interpolated low-energy image, $I_2(x, y)$ $I(x, y)=aI_1(x, y)-bI_2(x, y)$, where a and b are weighting factors.

The use of differential spatial sampling of the two image components captured by a radiographic dual screen system has advantages. The high-frequency component of an X-ray image captured by the first screen having a higher spatial frequency response (MTF) is detected by the first photosensor array having a higher sampling frequency. This can preserve details and/or sharpness of the X-ray image. In addition, the low-frequency and low-noise component of the X-ray image captured by the second screen having a lower spatial frequency response (MTF) but a higher sensitivity (X-ray absorption efficiency) is detected by the second photosensor array having a larger photosensor area and/or a lower sampling frequency. This can improve sensitivity and/or signal-to-noise (S/N) ratio of the imaging system.

Embodiments according to the invention can be considered to provide various complementary pixel characteristics (e.g., layout, size) to advantageously match corresponding scintillator characteristics. Further, exemplary embodiments can incorporate complementary pixel characteristics considered to correspond to vertical detector configurations and planar detector configurations.

FIGS. 2A and 2B show, respectively, schematic top and bottom views of the radiographic imaging detector illustrated in FIG. 1. FIGS. 2A and 2B also show an exemplary pixel circuitry for driving the first and second detector arrays 114, 134. As illustrated in FIGS. 2A and 2B, the first detector array 114 and the second detector array 134 have substantially the same surface area. However, the first detector array 114 comprises a 4×4 matrix of pixels 116, whereas the second detector array 134 comprises only a 2×2 matrix of pixels. As noted with respect to FIG. 1, each of the pixels 116 in the first detector array is substantially half as wide and half as long as the pixel 136 making up the second detector array 134. In this manner, 16 pixels 116 are provided in the first array 114 with/on the same surface area as four pixels 136 in the second array 134. Alignment between pixels of the first detector array 114 and the second detector array 134 can include edge alignment, sampling alignment, surface area alignment or the like.

FIG. 2C is a diagram that shows, respectively, representative layouts for the pixels 116 of the first detector 110 and for the pixels 136 of the second detector 130. As shown in FIG. 2C, the pixels 136 occupy a larger relative portion of the second detector 130 or have a less granular sampling grid than the pixels 116. As shown in FIG. 2C, a sampling grid 128 of the second detector 130 can be aligned with a sampling grid 126 of the first detector 110. The sampling grid alignment between the first detector 110 and the second detector 130 can reduce a number of interpolated sampling points for the less granular sampling grid (e.g., the sampling grid 128) or interpolation between images generated by the first detector 110 and the second detector 130 or combinations thereof. Further, although the sampling grid 128 and the sampling grid 126 illustrate an integer sampling pitch ratio, embodiments of the apparatus 100 are not intended to be so limited as fractional sampling pitch ratios (e.g., ½, ⅔, ¼) can also be used.

As also shown in FIG. 1, the first scintillating phosphor screen 122 and the second scintillating phosphor screen 142 have different thicknesses. In a preferred embodiment, the first phosphor screen 122 is relatively thinner than the second scintillating phosphor screen 142. This thinner first phosphor screen 122 is arranged to cooperate with the first pixels 116, which are more numerous than the second pixels 136. As is generally understood, the thinner the scintillating phosphor screen, the higher the spatial frequency and therefore the modulation transfer function is improved. Similarly, such characteristics are also preserved or increased by the higher density of pixels, for example, by having a smaller sampling pitch.

However, because it has a relatively thin scintillating screen and a larger number of small pixels, the first phosphor screen 122 also can have some drawbacks. Specifically, thin screens are relatively less efficient at absorbing X-rays, and therefore have a lower signal-to-noise ratio. Accordingly, the second scintillating phosphor screen 142 contained in the second detector 130 is relatively thicker. In this manner, the second phosphor screen 142, although having a lower resolution than the thinner screen used as the first scintillating phosphor screen 122, can absorb x-rays more efficiently, thereby providing a different signal or better SNR signal. The second scintillating phosphor screen 142 is coupled with the second pixels 136 to further increase or optimize the performance of a detector or the imaging apparatus 100. More specifically, the larger area pixels contained in the second detector array 134 have a better signal to noise ratio, because of the thicker screen, but also because the signal to noise ratio is improved (e.g., linearly) with pixel area.

Thus, this embodiment of FIG. 1 uses a first detector array with accompanying first phosphor screen to provide a higher resolution signal having higher spatial frequency and a higher modulation transfer function, and uses relatively fewer, larger pixels accompanying a thicker, second phosphor screen to provide a signal having better signal to noise ratio. A composite image can be formulated from the image captured by the first pixels 116 and the second pixels 136, as described above the image has significant or vastly improved image quality when compared to either of the first image or the second image, taken alone.

As noted above, FIGS. 2A and 2B also illustrate a preferred pixel circuitry for the imaging apparatus 100. FIG. 2A shows the pixel circuitry of the first detector 110, and FIG. 2B shows the pixel circuitry for the second detector 130. Each of the detectors 110, 130 includes a number of gate lines 146, each associated with a row, group or line of pixels, and a number of readout or data lines 148, each associated with a column, group or line of pixels. A voltage bias, $V_{BIAS}$, also is applied to each of the rows of pixels using bias lines 150. This pixel circuitry is well known in the art and will not be described in more detail herein. Other pixel circuits, such as three-transistor, four-transistor and shared transistor active pixel circuits, can be used to form a radiographic imaging array.

Figure 3:
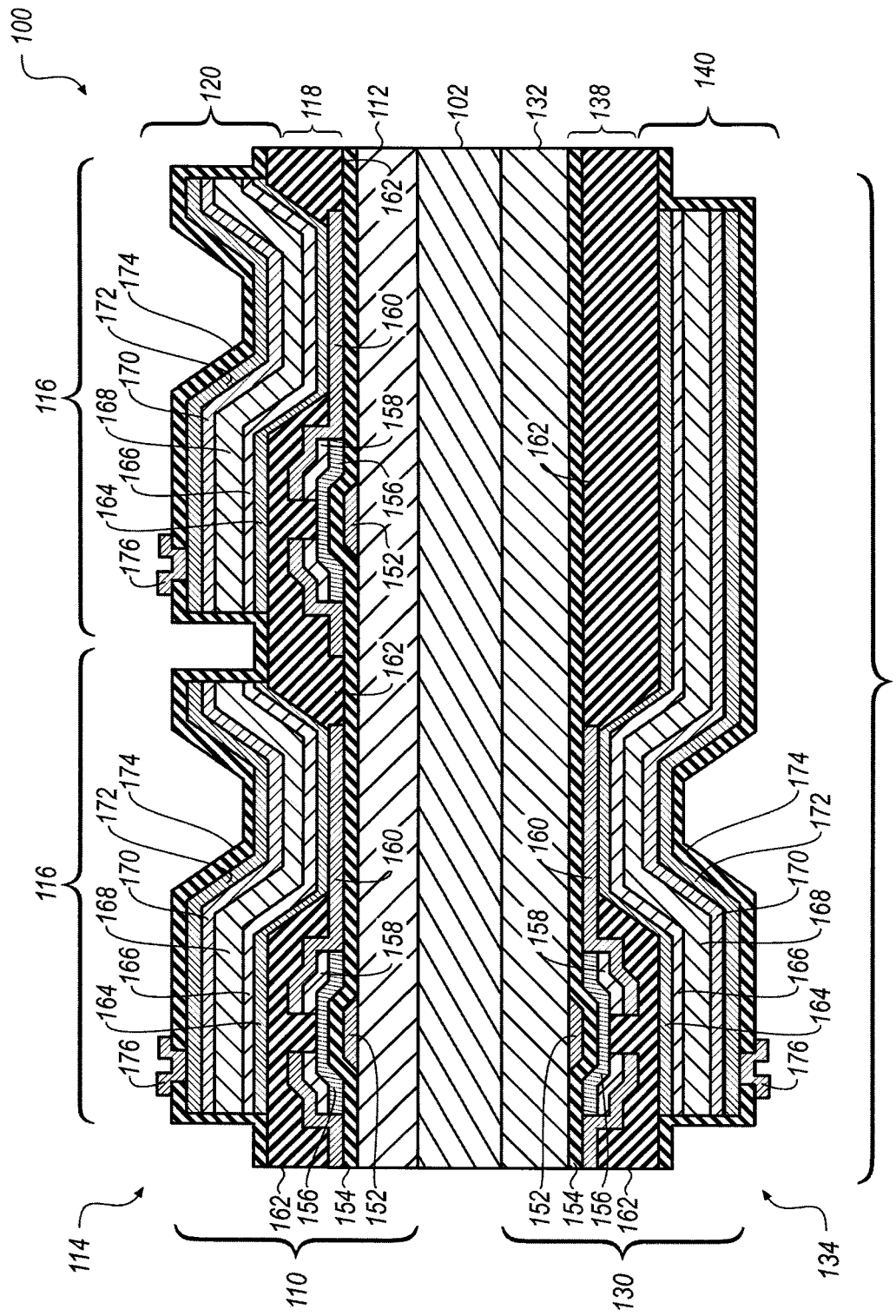
FIG. 3 is a detailed elevation view of the portion of the radiographic imaging detector illustrated in FIG. 1.

FIG. 3 illustrates an exemplary embodiment of the apparatus 100 shown in FIGS. 1, 2A, and 2B. Specifically, FIG. 3 shows an embodiment in which the first photosensitive elements 120 and the second photosensitive elements 140 are p-i-n-type photosensors and the first readout elements 118 and second readout elements 138 are thin film transistors (TFTs). Accordingly, each of the first pixels 116 and each of the second pixels 136 include a p-i-n photo sensor and a TFT.

As illustrated in FIG. 3, the first and second detectors 110, 130 have substantially the same construction, and the detectors are generally formed using known fabrication methods. First, the substrate 112, 132, which may be a glass substrate, is provided. A first metal layer 152 is deposited on the substrate 112, 132. This first metal layer 152 preferably forms the rows comprising the gate lines 146, described above in conjunction with FIGS. 2A and 2B, and gate electrodes for each of the readout elements 118, 138, e.g., the TFT in this embodiment. An insulating layer 154 is formed over the first metal layer 152. Among other functions, this insulating layer forms a gate dielectric of the TFT. An amorphous silicon layer 156 is deposited over the insulating layer, above the gate electrode formed by the first metal layer 152. An n-doped amorphous silicon layer 158 thereafter is formed over the intrinsic amorphous silicon layer 156, to form source and drain regions for the TFT. Finally, the TFT includes a second metal layer 160 formed over the n-doped amorphous silicon layer 158. This second metal layer 160 forms source and drain contacts for the TFT. The second metal layer 160 also preferably is used to form the readout lines 148 described above with reference to FIGS. 2A and 2B.

An insulating layer 162 thereafter is formed over the TFT, to separate the TFT from the photosensitive element, which will be formed on top of the TFT in this embodiment as follows. A third metal layer 164 is disposed over the insulating layer 162 and through a hole formed in the insulating layer contacts the second metal layer 160. This contact between the second and third metal layers 160, 164 provides an electrical connection between the photo sensor and the TFT. Formed successively on the third metal layer 164 are an n-doped amorphous silicon layer 166, an intrinsic amorphous silicon layer 168 and a p-doped amorphous silicon layer 170. Together, these layers form the p-i-n photodiode. Thereafter, a fourth metal layer 172 is disposed over the p-doped amorphous silicon layer 170. This fourth metal layer 172 forms a transparent electrode which acts as the top contact for the p-i-n photodiode. An insulating layer 174 is thereafter formed on the fourth metal layer 172 to insulate the photodiode from external influences, and a fifth metal layer 176 is formed over the insulating layer 174. Through a hole formed through the insulating layer 174, the fifth metal layer 176 contacts the fourth metal layer 172 providing an electrical connection thereto. The fifth metal layer 176 preferably forms the bias lines 150, also shown in FIGS. 2a and 2b.

In this embodiment of the invention, the first detector array and the second detector array are similarly constructed in that each includes p-i-n photodiodes and TFTs. In a first manufacturing scenario, the first detector array 114 and the second detector array 134 are formed separately, each on its respective substrate 112, 132, and once formed, are bonded to opposite sides of the filter 102. Alternatively, one of the substrates could be bonded to the filter before formation of the sensor array thereon, with the other of the substrates and the sensor arrays being later-formed on or attached to the opposite side of the filter 102. Further, the function of the filter 102 can be assisted or performed by one or both substrates 112, 132 and/or the filter 102.

Exemplary embodiments are not limited to any one manufacturing process for fabricating the imaging apparatus shown in the figures. The invention also is not limited to p-i-n photodiodes as the photosensitive elements. Any photosensitive elements could be used, including, but not limited to, MIS photosensors, p-n junction-type photosensors, or the like. Moreover, although the device of the first embodiment is shown with the photosensitive elements being stacked on top of the readout elements, such is not necessary. This may be done to increase fill factor for the apparatus, but the photosensitive elements could just as readily be arranged next to the readout elements, as will be described in connection with additional embodiments of the invention. It will also be recognized by those skilled in the art that semiconductor materials other than amorphous silicon, such as polycrystalline silicon, organic semiconductors, and various alloy semiconductors such as zinc oxide can be used for the backplane array and the sensing array.

Figure 4:
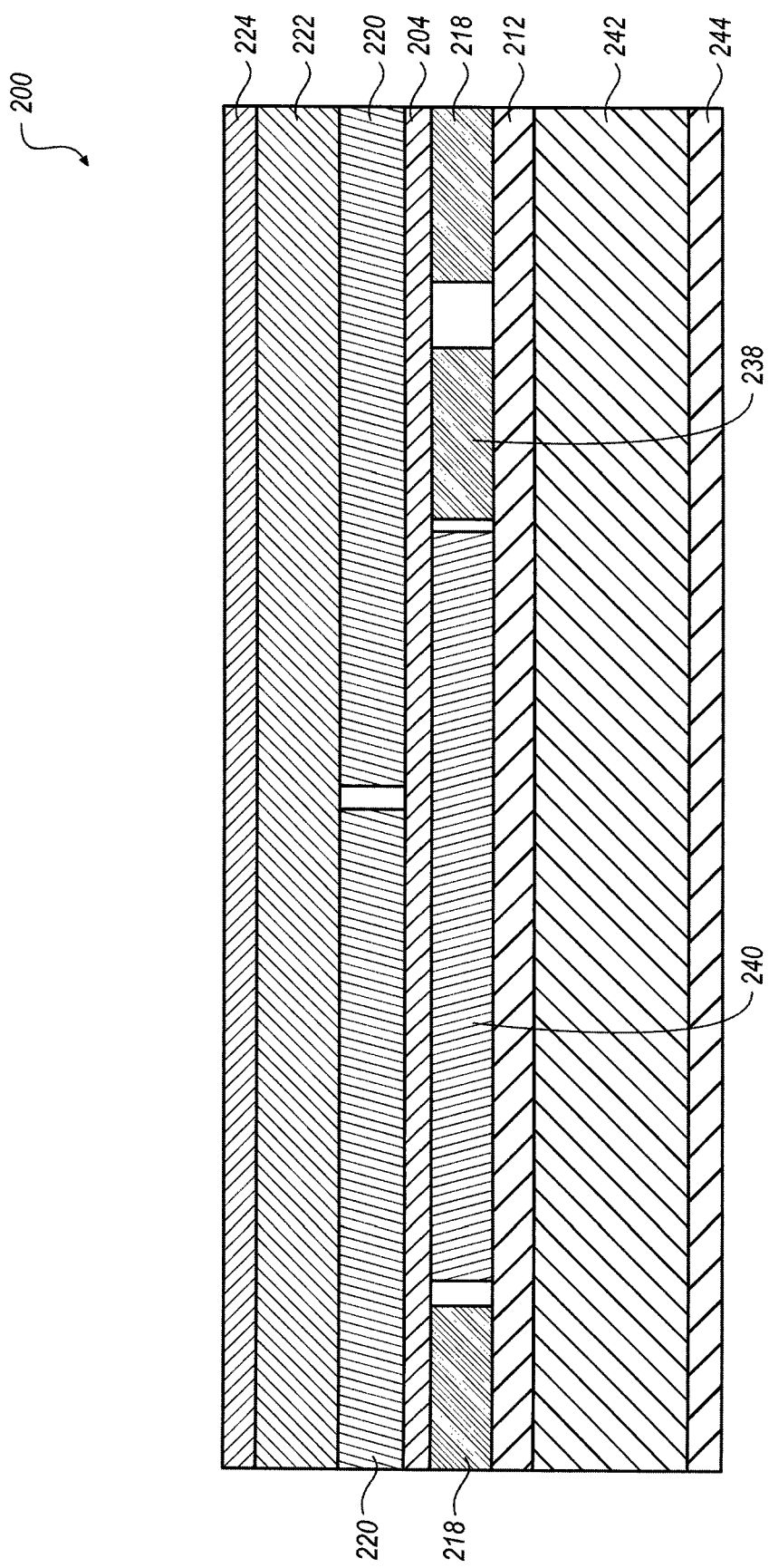
FIG. 4 is a schematic elevation view of a portion of a radiographic imaging detector according to another embodiment of the invention.

FIG. 4 illustrates an alternative dual screen radiographic imaging apparatus 200. The apparatus 200 is similar to the apparatus described above in connection with the embodiment shown in FIG. 1, in that it includes a first scintillating phosphor screen 222 and a second scintillating phosphor screen 242. First photosensitive elements 220 are provided that are primarily sensitive to the first scintillating phosphor screen 222 and second photosensitive elements 240 are provided that are primarily sensitive to the second scintillating phosphor screen 242.

Figure 5:
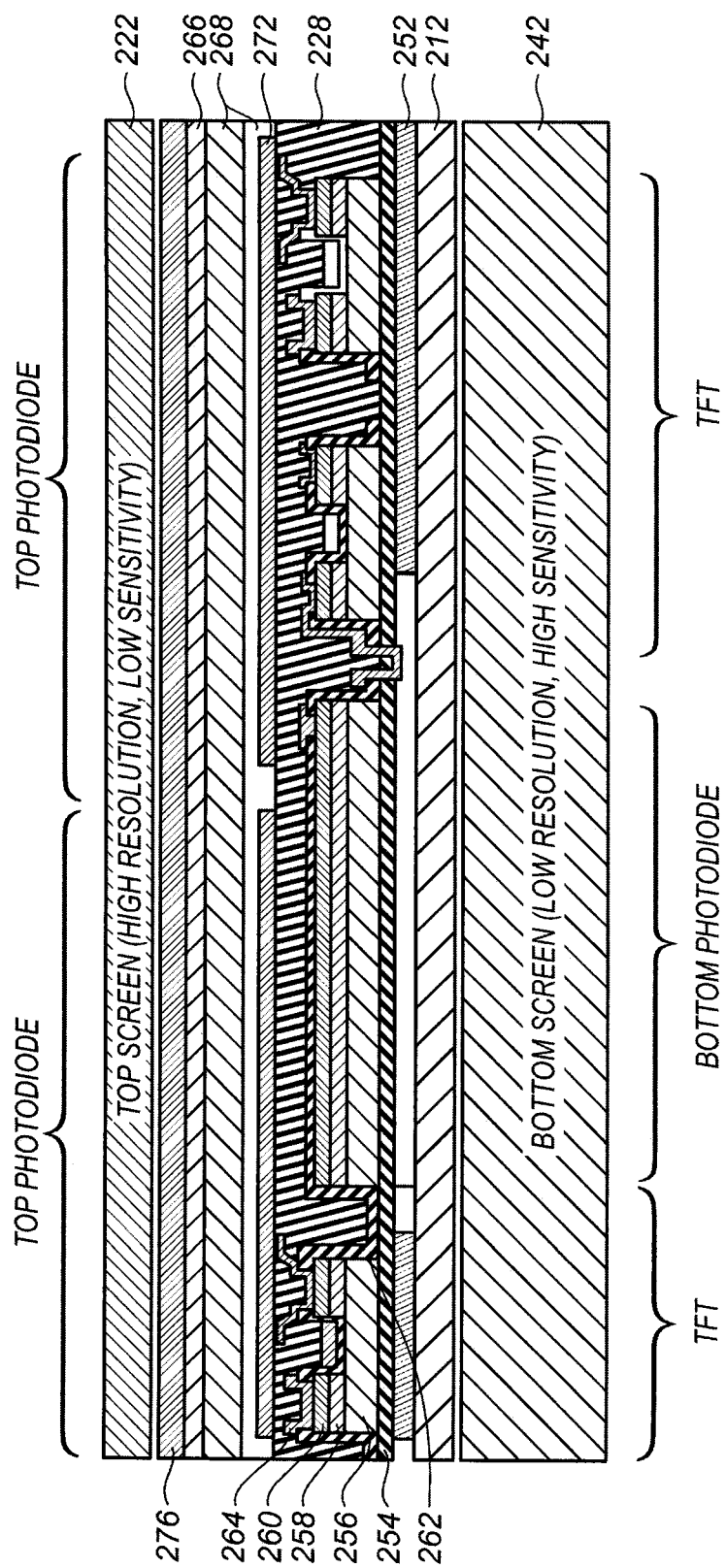
FIG. 5 is a detailed elevation view of the portion of the radiographic imaging detector illustrated in FIG. 4.

In this embodiment, the first photosensitive elements 220 are arranged in a first plane closer to the first scintillating phosphor screen 222, and the second photosensitive elements are arranged in a second plane, closer to the second scintillating phosphor screen 242. The first photosensitive elements 220 are separated from the second photosensitive elements 240 by a light management layer 204. The light management layer 204 can manage, reflect, block or direct visible light, x-rays or both. In this embodiment, unlike the embodiment discussed above with reference to FIGS. 1-3, readout elements 218, 238 associated with each of the photosensitive elements 220, 240 are provided on substantially the same plane, and this plane coincides with the second plane, on which the second photosensitive elements 240 are disposed. While the term "pixel" was used in FIGS. 1-3 to describe a photosensitive element and its associated readout element, in this embodiment, a "pixel" is used to describe the portion of the imaging array that includes both first photosensitive elements and a second photosensitive element, along with their associated readout elements. For example, FIG. 5 is a cross-section of a single pixel, which includes two first photosensitive elements and one second photosensitive element and their associated readout elements. However, more first photosensitive elements could be included in the pixel, for example, in a case in which more then two first photosensitive elements are disposed corresponding to or over a single second photosensitive element. This could be similar to a situation as shown in the embodiment of FIGS. 1-3, in which four first photosensitive elements occupy substantially the same surface area as one second photosensitive element.

FIG. 5 illustrates an exemplary construction of the imaging apparatus 200 shown in FIG. 4. The illustrated apparatus is constructed by first providing a substrate 212, which may be a glass or other transparent substrate. A first metal layer 252 is deposited on the substrate. This first metal layer 252 forms the gate electrodes for the TFTs as well as a metal layer associated with the second photosensitive element 240. An insulating layer 254 is disposed over the first metal layer 252. The insulator comprising this insulating layer may also be disposed between adjacent gate electrodes or the like.

The (three) readout elements 218, 238 and the second photosensitive elements 240 can be formed on the insulating layer by successively layering on the insulating layer 254, an intrinsic amorphous silicon layer 256, an amorphous silicon containing an n-type dopant 258, a second metal layer 260, a second insulating layer 262, and a third metal layer 264. The layers collectively form the second photosensitive elements 240, which are MIS photosensors, and the three readout elements namely, two TFTs corresponding to the two first photosensitive elements 220 and one second photosensitive element 240 in each pixel. For example, a TFT is formed by the first metal layer 252, which forms the gate electrode and gate lines, the first insulating layer 254, which forms the gate dielectric, the intrinsic amorphous silicon layer 256, which forms the channel, the n-doped amorphous silicon layer 258, which forms the source and drain electrodes, the second metal layer 260, which forms the source and drain contacts, and the third metal layer 264, which forms interconnections between the TFTs and the photosensitive elements to which the TFTs are associated. These layers also can form the layers of the second photosensitive elements, which is an MIS photosensor, as noted above.

Of the three TFTs shown in FIG. 5, two are associated with the first photosensitive elements 220, which are disposed above the second photosensitive element 240. An intermediate insulating layer 228 is formed over the second photosensitive element and the TFTs to form a substantially planar surface upon which the first photosensitive elements are formed. Masking techniques or the like may be used to electrically interconnect the to-be-formed first photosensitive elements 220 to the third metal layer 264. Each of the first photosensitive elements 220 includes a fourth metal layer 272 forming a gate electrode, an intrinsic amorphous silicon layer 268 forming a channel region, an n-doped amorphous silicon layer 266, and a fifth metal layer 276 forming a transparent contact. An insulating layer 274 (not shown) also may be provided on top of the fifth metal layer 276 and in-between the first photosensitive elements.

The first scintillating phosphor screen 222 is disposed above the first photosensitive elements 220, and the second scintillating phosphor screen 242 is disposed below the substrate as oriented in FIG. 5. First and second light absorbing layers 224 and 244 (shown in FIG. 4) also may be provided.

Figure 6:
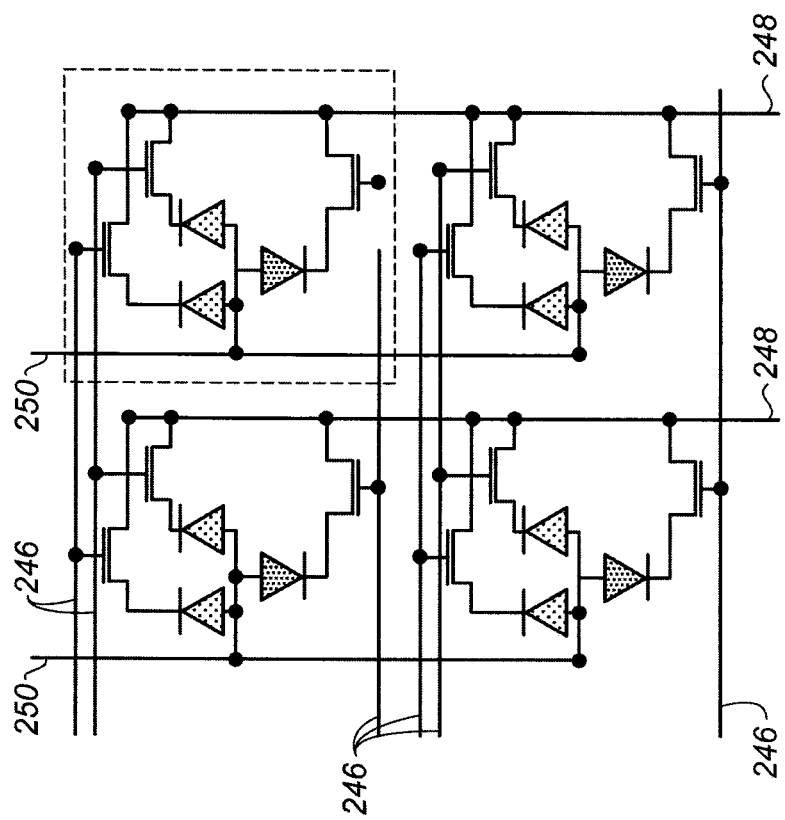
FIG. 6 is a schematic circuit diagram of the portion of the radiographic imaging detector illustrated in FIG. 4.

FIG. 6 illustrates pixel circuitry for the embodiment disclosed in FIGS. 4 and 5. As illustrated herein, a 2×2 array of pixels are arranged in rows and columns. In this arrangement, a bias voltage, $V_{BIAS}$, is applied along vertical bias lines 250 connected to the photosensors. Gate lines 246 or row select switches are provided horizontally in the figures and are attached to the gate electrodes of the TFT readout elements. Data lines 248 also are provided, arranged vertically in FIG. 6, and information corresponding to the image detected at each of the photo sensors is output via these data lines.

As with the embodiment illustrated in FIGS. 1-3, the embodiment illustrated in FIGS. 4-6 has first photosensitive elements having a first surface area and second photosensitive elements having a second surface area different from the first surface area. Also similar to the first embodiment, the larger surface area or less abundant photosensitive elements are primarily sensitive to light from the thicker scintillating phosphor screen to provide a higher signal to noise ratio. The smaller surface area, but more abundant, photosensitive elements are responsive to a thinner scintillating phosphor screen to increase or maximize modulation transfer frequency and resolution.

Similar to operations of the array of the first embodiment, the radiographic detector apparatus of FIGS. 4-6 is exposed with X-rays. A portion of the X-rays are absorbed in the first scintillating phosphor screen and another portion of the X-rays are absorbed in the second scintillating phosphor screen. Absorption of X-rays results in the emission of light from each of the screens. In the example shown in FIG. 4, the first phosphor screen can be different or thinner than the second screen, resulting in reduced light scattering and higher MTF. A portion of the light from the first screen is sensed by the first photodiodes, resulting in photogenerated charge being stored on the photodiode. Following exposure, the row select lines of the imaging array are scanned, transferring the charge from the photodiodes to the datalines in each column. The charge is sensed by charge-sensitive amplifiers at the end of each column.

As should be understood by one of ordinary skill in the art, additional methodologies are known for improving signal-to-noise ratio and/or modulation transfer frequency. For example, although the first scintillating phosphor screen is thinner than the second scintillating phosphor screen in each of the foregoing embodiments, such is not necessary. Scintillator screens of differing composition may more closely correspond in thickness when the composition of the two is different. For example, the first and second phosphor screens may be formed of materials having elements of different atomic numbers. Generally, an element having a higher atomic number will absorb a higher energy component of x-ray radiation. Moreover, it is known that some materials are more sensitive to radiation than others. Accordingly, material selection for the two phosphor screens could provide performance similar to the relatively thicker and thinner screens described in connection with the foregoing embodiments. For example, scintillator properties of particular relevance to the embodiments include scintillator thickness, scintillator composition, scintillator resolution, and scintillator MTF. As noted above, the scintillator resolution and scintillator MTF may be driven by the composition and thickness of the scintillator.

Similarly, the characteristics of the photosensitive element may be changed to modify or maximize performance of imaging apparatus embodiments. While the foregoing embodiments described configurations in which first photosensitive elements are more plentiful in number and have a smaller surface area than second photosensitive elements, such is not required. For example, the first and second photosensitive elements could vary based on pitch, area, sensitivity, and/or density.

Other exemplary embodiments also are contemplated. For example, although the first and second photosensitive elements in the foregoing embodiments have been disposed in separate planes, it may be possible for the first and second photosensitive elements to be in the same plane. Such an arrangement would provide a more compact device. An example of this is illustrated in FIGS. 7 and 8.

Figure 7:
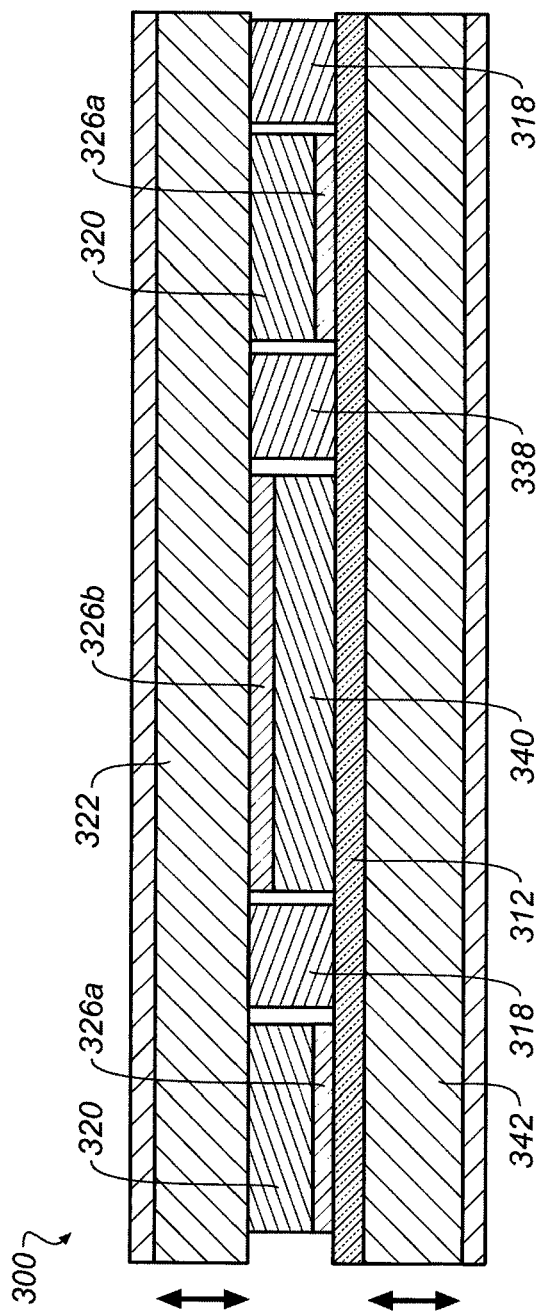
FIG. 7 is a schematic elevation view of a radiographic imager according to yet another embodiment of the invention.
Figure 8:
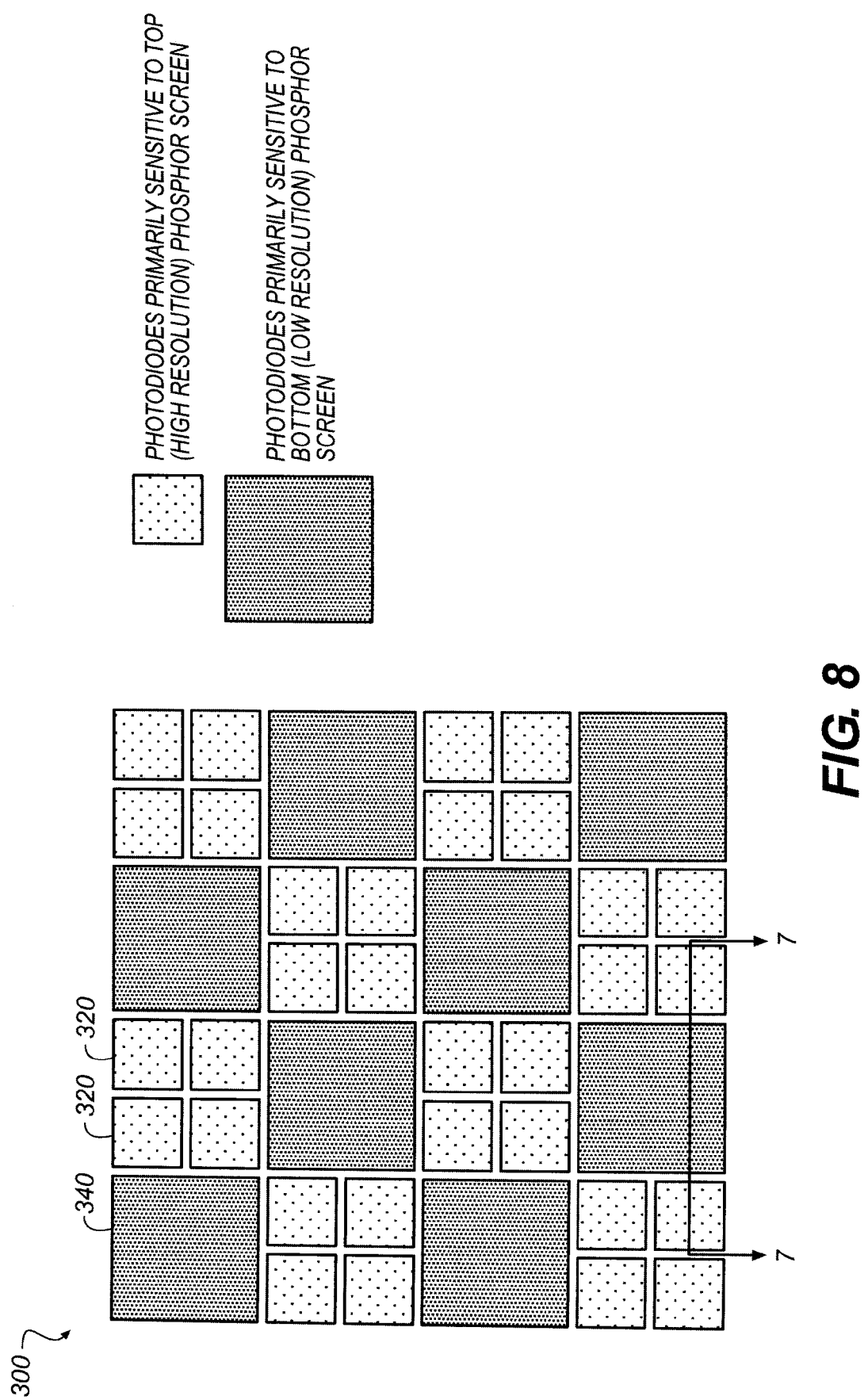
FIG. 8 is a schematic top view of an array including the pixels illustrated in FIG. 7.

As shown in FIG. 7, an alternate radiographic imaging apparatus 300 includes first photosensitive elements 320 responsive to a first scintillating phosphor screen 322 formed proximate a top of the imaging apparatus 300 and second photosensitive elements 340 sensitive to a second scintillating phosphor screen 342 arranged at the bottom of the imaging apparatus 300. The photosensitive elements 320, 340 are formed on a substrate 312, as are the corresponding readout elements 318, 338. First light blocking layers 326a, 326b are formed, respectively, between the first photosensitive elements 320 and the second scintillator 342 and between the second photosensitive elements 340 and the first scintillator 322. The light blocking layers reduce or prevent the first photosensitive elements 320 from receiving light from the second scintillator 342 and the second photosensitive elements 340 from receiving light from the first scintillator 322. Similar to the embodiment of FIG. 1, and as shown in FIG. 8, each of the first photosensitive elements 320 has a surface area that is approximately one-quarter the size of each of the second photosensitive elements 340. As illustrated in this embodiment, a checkerboard pattern is formed as the imaging array, with a second photo sensitive element alternating with a group of four first photosensitive elements.

The imaging apparatus according to this embodiment results in the first photosensitive elements and the second photosensitive elements occupying approximately the same surface area. This is not necessary, however. For example, the surface area of the first photosensitive elements and the second photosensitive elements can be different, could be a ratio such as 2-to-1, 4-to-1 or more. Further, interspaced (e.g., alternating, 2-to-1) checkerboard, rows or columns of the first photosensitive elements (e.g., 320) and the second photosensitive elements (e.g., 340) can be used.

Figure 9:
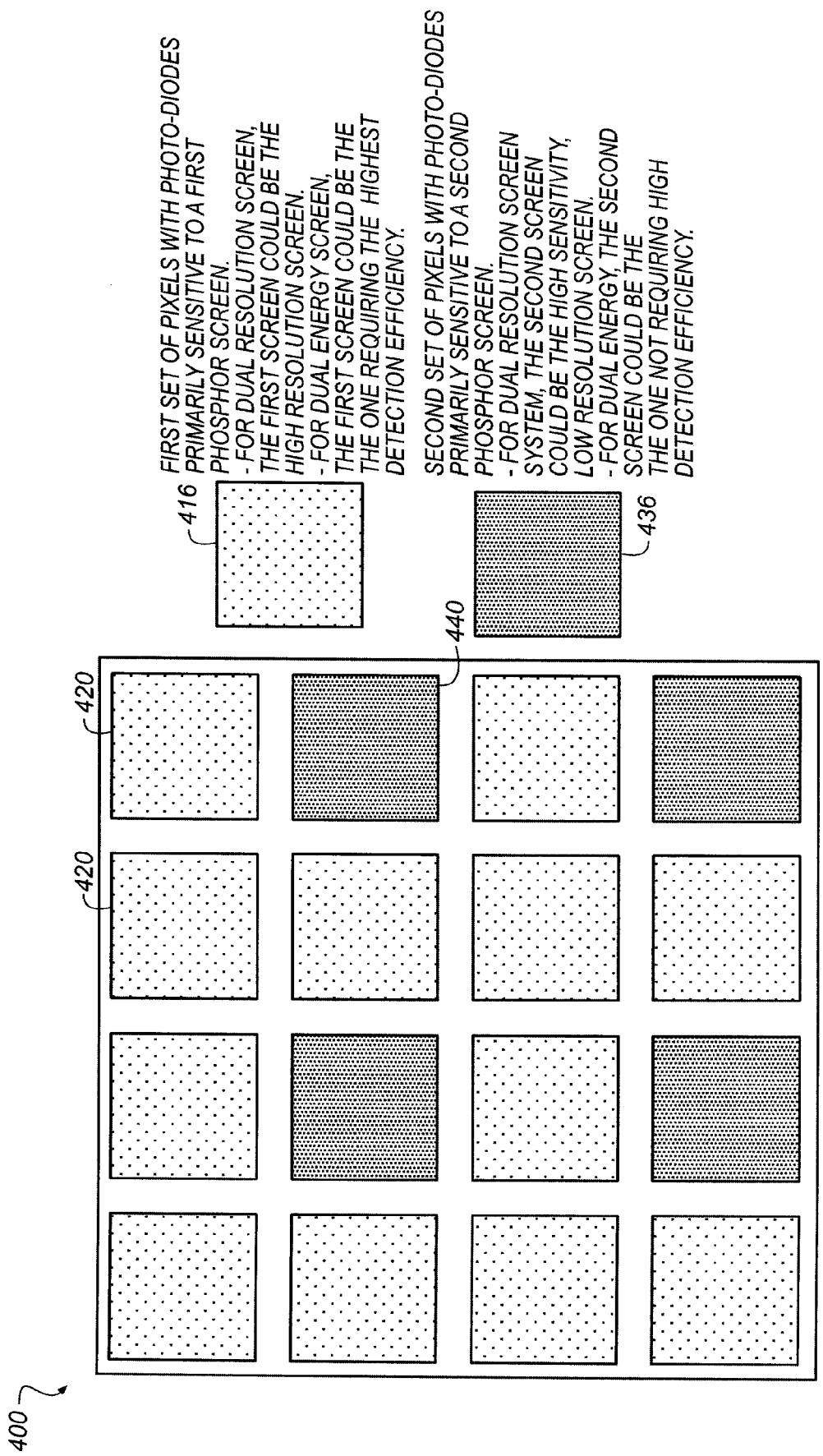
FIG. 9 is a schematic top view of an array of imaging sensing pixels according to still another embodiment of the invention.

In another exemplary embodiment illustrated in FIG. 9, first and second pixels 416, 436 are approximately the same size, but more first pixels 416 are included in the array than second pixels 436. Alternatively, more second photosensitive elements 440 could be included in an imaging array than first photosensitive elements 420. As illustrated in FIG. 9, an imaging apparatus 400 includes three first photosensitive elements 420 for every one second photo sensitive element 440. The first photosensitive elements 420 are sensitive to a first scintillator (not shown), and the second photosensitive elements 440 are sensitive to a second scintillator. More or less of the first and second photosensitive elements also could be provided, as differing results are required.

In the embodiment of FIG. 9, the first scintillator preferably is chosen to have different scintillator properties from the second scintillator. These properties may include thickness and material composition (e.g., materials having different atomic numbers), among other properties.

Figure 10:
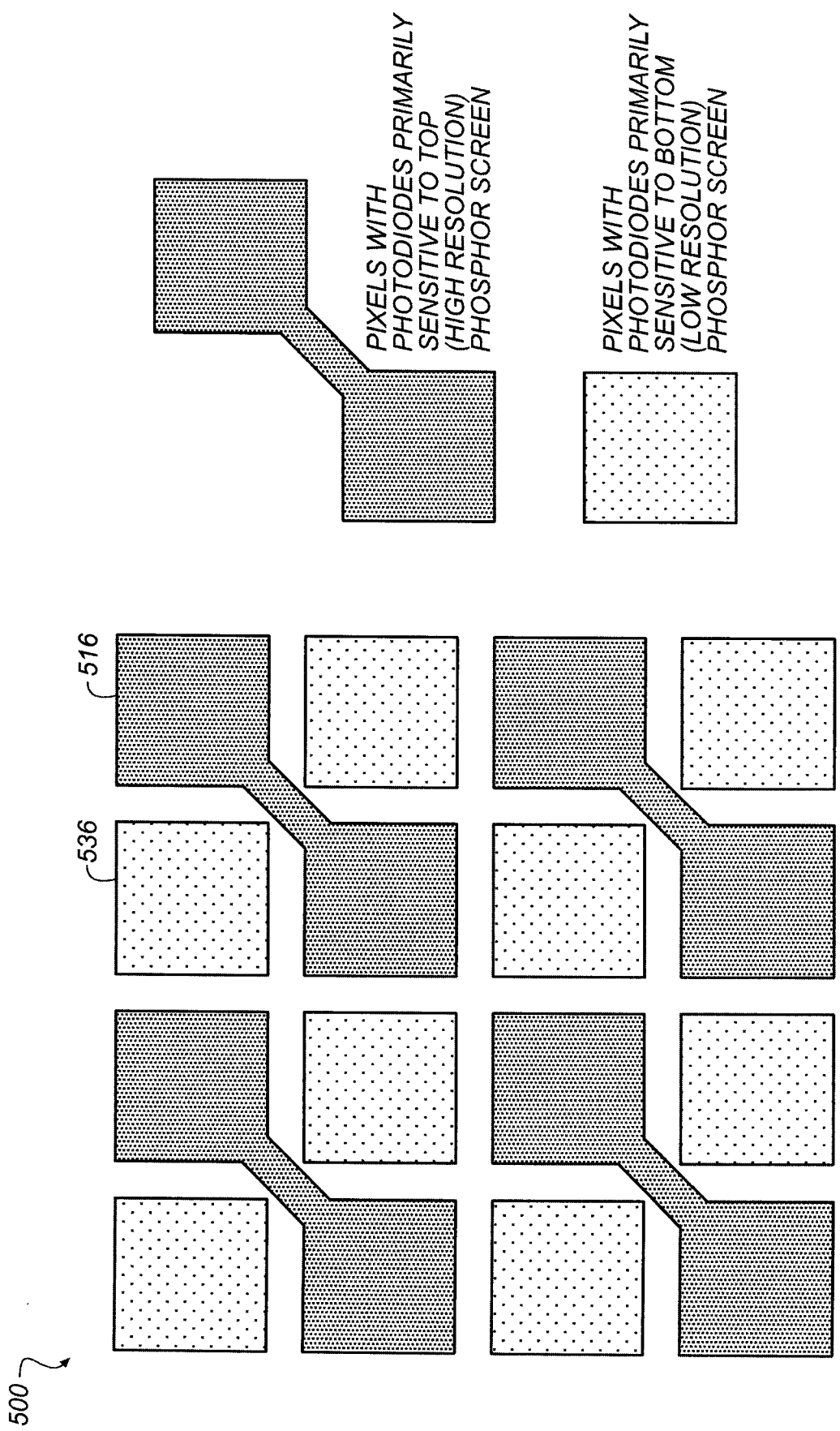
FIG. 10 is a schematic top view of an array of image detecting pixels according to another embodiment of the invention.
Figure 11:
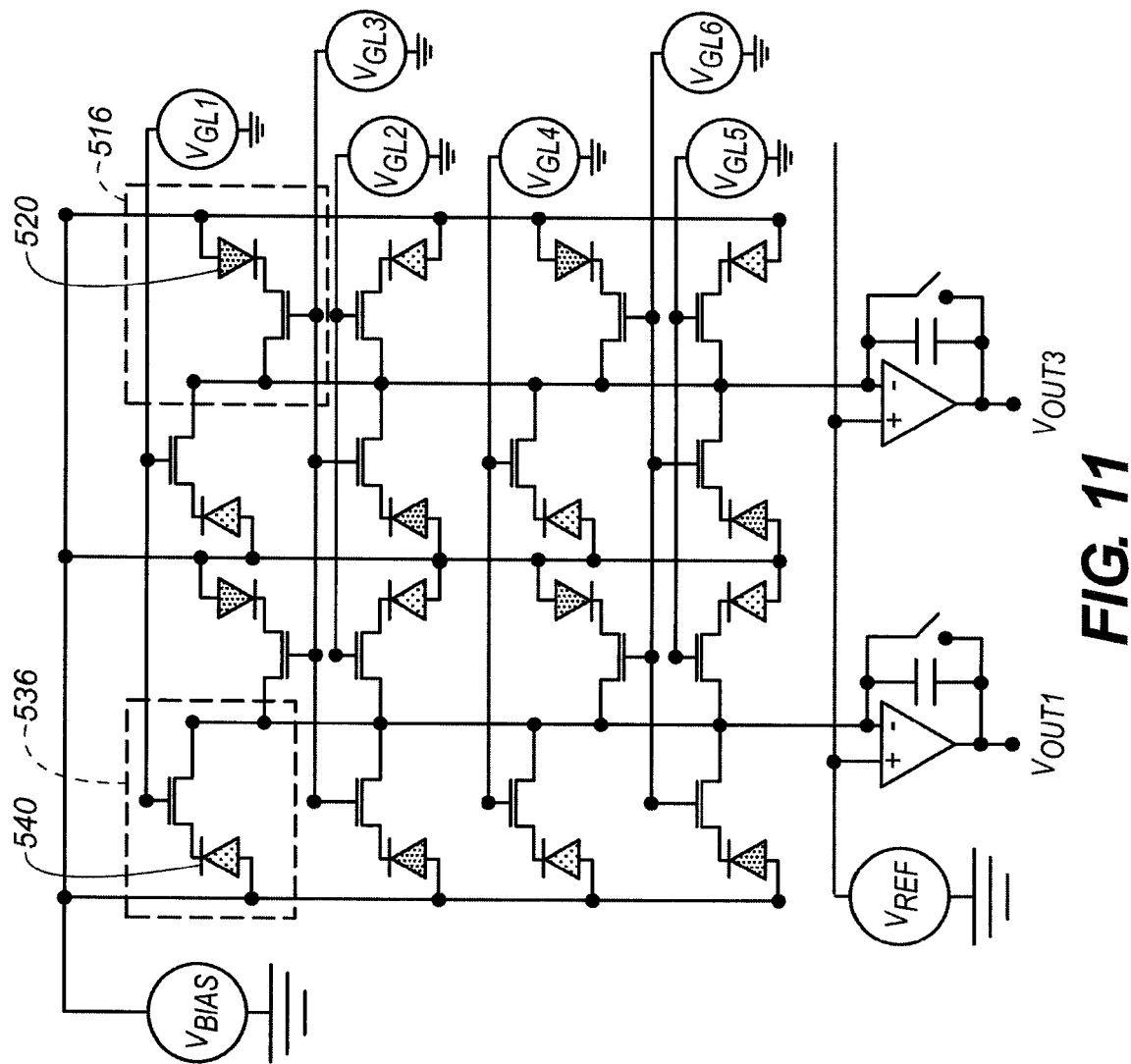
FIG. 11 is a schematic circuit diagram of the array illustrated in FIG. 10.

Yet another embodiment of the invention is illustrated in FIGS. 10 and 11. In these Figures, a detector apparatus 500 includes a plurality of first pixels 516 and second pixels 536. As with previous embodiments, the photosensitive elements 520 in the first pixels 516 are sensitive to a first scintillator (not shown) and photosensitive elements 540 in the second pixels 536 are sensitive to a second scintillator (not shown). In this embodiment, first photosensitive elements arranged cater-corner to each other are connected. In this manner, horizontally adjacent lines of first photosensitive elements can be readout using the same gate line, as illustrated in FIG. 11.

Alternative exemplary embodiments according to the application can use the read out circuitry (e.g., gate lines, data lines) for the first detector and the second detector to take advantage of different characteristics of the first scintillator and the second scintillator. Thus, the read out circuitry for the first detector can be different than the read out configuration for the second detector to obtain a different granularity (finer granularity, reduced granularity) of sensed data for first detector and the second detector, respectively. In such exemplary embodiments, the different granularity characteristics generated by the read out circuitry can be matched or selected based on the corresponding different characteristics between the first and second scintillators (e.g., one or more of scintillator thickness, scintillator composition, scintillator resolution, and scintillator MTF). Alternatively, the pixel configurations (and/or read out circuitry configurations) can be identical between the first detector and the second detector, however, the data can be electrically combined (e.g., using one or more multiplexers or logic circuits; by combining rows and/or columns on/off the pixel array) to reduce the granularity of the sensed image data of one of the first detector and the second detector to take advantage of the corresponding different characteristics between the first and second scintillators. For example, in one embodiment, the pixels of the first detector and the second detector of a radiographic imaging apparatus can be identical in size, area or pitch, but the data obtained (e.g., using analog and/or digital circuit elements) by four pixels of the second detector can be combined to take advantage of differing characteristics between the first scintillator 122 and the second scintillator 142.

Exemplary embodiments of a single-exposure dual-energy digital radiography apparatus have various advantages over the prior art. There is no switching of X-ray tube voltage as required with such known devices. There can be a reduction of misregistration artifacts (e.g., patient motion) in images. There can be lower X-ray tube loading, and/or lower X-ray exposure on the patient. In addition, higher detector performance in spatial resolution and/or signal-to-noise ratio can yield higher image quality and subsequent improvement in detection or characterization of diseases through dual-energy imaging. Moreover, there can be better integration of dual energy imaging into the current clinical workflow providing higher operation efficiency without the need for digitizing the film images (SF apparatus), scanning the imaging plates (CR apparatus), or double exposure of the patient (dual-exposure DR apparatus).

The present invention has been described with regard to preferred embodiments and their variations. Other variations to the disclosure may also be apparent to those of ordinary skill in the art. The invention is intended to be limited only by the scope of the accompanying claims; not by the disclosure or the figures. Further, features applicable for one embodiment can be utilized in combination with features described for different exemplary embodiments. For example, features described with respect to an embodiment addressed b FIG. 1 can be used in combination with features corresponding to one or more of embodiments addressed by FIGS. 7-10.

PARTS LIST 100 radiographic imaging apparatus
102 filter
110 first detector
112 first substrate
114 first detector array
116 first pixels
118 first readout element
120 first photosensitive element
122 first scintillating phosphor screen
124 light management layer
126 sampling grid
128 sampling grid
130 second detector
132 second substrate
134 second detector array
136 second pixels
138 second readout element
140 second photosensitive element
142 second scintillating phosphor screen
144 second light management layer
146 gate lines
148 readout or data lines
150 bias lines
152 first metal layer
154 insulating layer
156 amorphous silicon layer
158 n-doped amorphous silicon layer
160 second metal layer
162 insulating layer
164 third metal layer
166 n-doped amorphous silicon layer
168 intrinsic amorphous silicon layer
170 p-doped amorphous silicon layer
172 fourth metal layer
174 insulating layer
176 fifth metal layer
200 radiographic imaging apparatus
204 light management layer
212 substrate
218 readout element
220 first photosensitive element
222 first scintillating phosphor screen
224 light absorbing layer
228 intermediate insulating layer
238 readout element
240 second photosensitive element
242 second scintillating phosphor screen
244 light absorbing layer
246 gate lines
248 data lines
250 bias lines
252 first metal layer
254 insulating layer
256 intrinsic amorphous silicon layer
258 n-doped amorphous silicon layer
260 second metal layer
262 second insulating layer
264 third metal layer
266 n-doped amorphous silicon layer
268 intrinsic amorphous silicon layer
272 fourth metal layer
274 insulating layer
276 fifth metal layer
300 radiographic imaging apparatus
312 substrate
318 readout element
320 first photosensitive element
322 first scintillating phosphor screen
326a, 326b first light blocking layers
338 readout element
340 second photosensitive element
342 second scintillating phosphor screen
400 imaging apparatus
416 first pixels
420 first photosensitive element
436 second pixels
440 second photosensitive element
500 detector apparatus
516 first pixels
520 photosensitive element
536 second pixels
540 photosensitive element

We claim:

1. A radiographic imaging apparatus comprising:
   a first scintillator disposed on a first side of a substrate and having first scintillator properties including scintillator resolution and scintillator sensitivity;
   a second scintillator disposed on a second side of the substrate, opposite the first side, and having second scintillator properties including scintillator resolution and scintillator sensitivity different from the first scintillator properties;
   a plurality of first photosensitive elements to receive light from the first scintillator and having first photosensitive element characteristics including photosensitive element resolution and photosensitive element sensitivity chosen to cooperate with the first scintillator properties; and
   a plurality of second photosensitive elements arranged to receive light from the second scintillator and having second photosensitive element characteristics including photosensitive element resolution and photosensitive element sensitivity different from the first photosensitive element characteristics and chosen to cooperate with the second scintillator properties,
   where the first scintillator has a higher resolution than the second scintillator, the first photosensitive elements have a higher spatial sampling frequency than the second photosensitive elements, the second scintillator has a higher sensitivity than the first scintillator, and the second photosensitive elements have a higher sensitivity than the first photosensitive elements.

2. The apparatus of claim 1, wherein the first and second scintillator properties further comprise at least one of scintillator thickness, scintillator composition, and scintillator modulation transfer function (MTF).

3. The apparatus of claim 1, wherein the first and second photosensitive element characteristics further comprise at least one of photosensitive element pitch, photosensitive element area, and photosensitive element density.

4. The apparatus of claim 3, wherein an area or a pitch of the first photosensitive element is smaller than an area or a pitch of the second photosensitive element.

5. The apparatus of claim 4, wherein the number of first photosensitive elements is greater than the number of second photosensitive elements.

6. The apparatus of claim 4, wherein the areas of the first photosensitive elements are smaller than the areas of the second photosensitive elements.

7. The apparatus of claim 1, wherein the first and second photosensitive elements are disposed on the same side or disposed on opposite sides of the substrate.

8. The apparatus of claim 1, wherein the first photosensitive elements are disposed relatively closer to the first scintillator and the second photosensitive elements are disposed relatively closer to the second scintillator.

9. The apparatus of claim 1, wherein a sum of the surface areas of the plurality of first photosensitive elements is different from a sum of the surface areas of the plurality of second photosensitive elements.

10. The apparatus of claim 1, further comprising a light-blocking layer disposed between at least one of each of the plurality of first photosensitive elements and the second scintillator and each of the plurality of second photosensitive elements and the first scintillator.

11. The apparatus of claim 1, wherein
   a. the first scintillator comprises a first phosphor material having an element of a first atomic number
   b. the second scintillator comprises a second phosphor material having an element of a second atomic number; and
   c. the first atomic number exceeds the second atomic number, so that the first phosphor material absorbs a higher energy component of x-ray radiation.

12. The apparatus of claim 1 where a pixel of the radiographic imaging apparatus comprises at least one first photosensitive element and at least one second photosensitive element, where the first and second photosensitive elements are arranged in an array and wherein the first and second photosensitive elements have a different pitch.

13. The apparatus of claim 1, where each second photosensitive element in a second layer is matched to two or more first photosensitive elements in a first layer different from the second layer, where a center of said each second photosensitive element is aligned to a center of a single one of the two or more first photosensitive elements.

14. A radiographic imaging device comprising:
   a plurality of first pixels, each first pixel comprising (i) a first photosensitive element having a first photosensitive element characteristic and (ii) a first readout element;
   a first scintillator proximate the plurality of first photosensitive elements, the first photosensitive elements being primarily sensitive to the first scintillator;
   a plurality of second pixels, each second pixel comprising (i) a second photosensitive element having a second photosensitive element characteristic different from the first photosensitive element characteristic and (ii) a second readout element;
   a second scintillator proximate the plurality of second pixels, the second photosensitive elements being primarily sensitive to the second scintillator; and
   a substrate disposed between the first and second scintillators,
   wherein the first photosensitive elements are disposed on a first side of the substrate and the second photosensitive elements, first readout elements and second readout elements are disposed on a second, opposite side of the substrate, an electrical connection being formed through the substrate connecting the first photosensitive elements to their respective first readout elements, wherein the first and second photosensitive element characteristics comprise at least one of photosensitive element area, photosensitive element pitch, photosensitive element sensitivity, and total number of photosensitive elements.

15. The apparatus of claim 14, wherein the first photosensitive element characteristic is chosen based on a first property of the first scintillator and the second photosensitive element characteristic is chosen based on a second property of the second scintillator, and wherein the first and second scintillators have at least one of different compositions and different thicknesses.

16. The apparatus of claim 14, wherein the first scintillator is thinner than the second scintillator and the first photosensitive elements have a shorter pitch than the second photosensitive elements, and wherein the second photosensitive elements have a larger area than the first photosensitive elements.

17. The apparatus of claim 14, further comprising a light filter disposed between at least one of the substrate and the first photosensitive elements and the substrate and the second photosensitive elements.

18. The apparatus of claim 14, wherein the first photosensitive elements are disposed in a first plane and the second photosensitive elements are disposed in the first plane or a second plane, different from the first plane.

19. The apparatus of claim 18, wherein at least one of the first and second readout elements are disposed in the first plane or the second plane, or wherein the first readout elements and the second readout elements are disposed in one of the second plane or the first plane.

20. The apparatus of claim 14, where each second photosensitive element in a second layer is matched to two or more first photosensitive elements in a first layer different from the second layer, where a center of said each second photosensitive element is aligned to a center of a single one of the two or more first photosensitive elements.

21. A method for operating a radiographic imaging apparatus for capturing a plurality of x-ray images of an object comprising:
 providing a first scintillator for a first detector including first scintillator properties;
 providing a second scintillator for a second detector including second scintillator properties different from the first scintillator properties;
 providing a plurality of first pixels optically coupled to the first scintillator, each first pixel comprising (i) a first photosensitive element having first photosensitive element characteristics selected to cooperate with the first scintillator properties and (ii) a first readout element; and
 providing a plurality of second pixels optically coupled to the second scintillator, each second pixel comprising (i) a second photosensitive element having second photosensitive element characteristics different from the first photosensitive element characteristics and selected to cooperate with the second scintillator properties and (ii) a second readout element;
 wherein the first and second photosensitive element characteristics comprise at least one of photosensitive element area, photosensitive element pitch, photosensitive element sensitivity, and total number of photosensitive elements,
 wherein the first photosensitive elements are disposed in a first layer and the second photosensitive elements are disposed in a second layer that is different from the first layer, and wherein the first and second readout elements are both disposed in the first layer or both disposed in the second layer.

22. A radiographic imaging apparatus comprising:
 a first scintillator disposed on a first side of the substrate and having first scintillator properties;
 a second scintillator disposed on a second side of the substrate, opposite the first side, and having second scintillator properties different from the first scintillator properties;
 a plurality of first photosensitive elements to receive light from the first scintillator and having first photosensitive element characteristics chosen to cooperate with the first scintillator properties; and
 a plurality of second photosensitive elements arranged to receive light from the second scintillator and having second photosensitive element characteristics different from the first photosensitive element characteristics and chosen to cooperate with the second scintillator properties,
 where each second photosensitive element in a second layer is matched to two or more first photosensitive elements in a first layer different from the second layer, where a center of said each second photosensitive element is aligned to a center of a single one of the two or more first photosensitive elements.

* * * * *